United States Patent [19]

Hochreuter

[11] 4,151,139
[45] Apr. 24, 1979

[54] WATER SOLUBLE POLYGLYCOL DIEPOXIDE-POLYAMINE AMIDE REACTION PRODUCTS AS ANTISTATIC AGENTS

[75] Inventor: Richard Hochreuter, Oberwil, Switzerland

[73] Assignee: Sandoz Ltd., Basel, Switzerland

[21] Appl. No.: 881,825

[22] Filed: Feb. 27, 1978

Related U.S. Application Data

[63] Continuation of Ser. No. 693,019, Jun. 4, 1976, abandoned, which is a continuation of Ser. No. 508,556, Sep. 23, 1974, abandoned, which is a continuation of Ser. No. 282,610, Aug. 21, 1972, abandoned.

[30] Foreign Application Priority Data

Aug. 25, 1971 [CH] Switzerland ................... 12501/71

[51] Int. Cl.² ...................... C08G 59/04; C08G 59/44

[52] U.S. Cl. ................ 260/29.2 EP; 8/115.5; 260/18 EP; 260/830 R; 260/DIG. 17; 428/394; 528/332

[58] Field of Search ............... 528/332; 260/29.2 EP, 260/18 EP

[56] References Cited

U.S. PATENT DOCUMENTS

| | | | |
|---|---|---|---|
| 2,909,448 | 10/1959 | Schroeder | 260/29.2 EP |
| 2,965,517 | 12/1960 | Albrecht et al. | 260/29.2 EP |
| 3,154,429 | 10/1964 | Albrecht et al. | 260/29.2 EP |
| 3,639,296 | 2/1972 | Frotscher et al. | 260/29.2 EP |

*Primary Examiner*—John C. Bleutge
*Assistant Examiner*—A. H. Koeckert
*Attorney, Agent, or Firm*—Gerald D. Sharkin; Richard E. Vila; Thomas C. Doyle

[57] ABSTRACT

The invention provides novel polyaddition products of polyglycol diepoxides and polyamine derivatives, which products are useful as antistatic agents.

19 Claims, No Drawings

WATER SOLUBLE POLYGLYCOL DIEPOXIDE-POLYAMINE AMIDE REACTION PRODUCTS AS ANTISTATIC AGENTS

This is a continuation, of application Ser. No. 693,019, filed June 4, 1976, which in turn is a continuation, of application Ser. No. 508,556, filed Sept. 23, 1974, which in turn is a continuation of application Ser. No. 282,610, filed Aug. 21, 1972, all three of which are now abandoned.

This invention relates to novel agents for the permanent antistatic finishing of synthetic polymers, in particular those of hydrophobic character.

The tendency to accumulate static electricity is a common disadvantage of many synthetic polymers, e.g. fibres, foam plastics, filaments, yarns and textiles in manufactured form. Known antistatic agents often show poor wash fastness and some impart undesirable properties to the material, e.g. unpleasant handle.

The present invention provides antistatic agents of improved fastness to washing and dry cleaning which impart a soft handle to the treated materials.

More particularly, the present invention provides polyaddition products of (a) at least one polyglycol diepoxide of formula I,

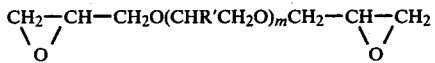

in which
R' signifies hydrogen or methyl, and
m signifies an integer of from 1 to 40,
with (b) at least one amide of formula II,

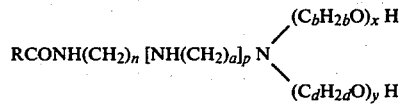

in which
R signifies an alkyl radical of 1 to 21 carbon atoms,
x and y are the same or different and each signifies 0,1,2, or 3
p signifies 1,2,3 or 4 and
n,a,b and d are the same or different, and each signifies 2 or 3,
having a viscosity at 20° C. of about 50 to about 20,000 cp, and derivatives thereof with acid.

The preferred polyaddition products of the invention are those having a viscosity at 20° C. of from about 100 to about 15,000 cp.

The invention also provides a process for the production of the polyaddition products of the invention which comprises reacting a compound of formula I with a compound of formula II and, where required, treating the resulting product with an acid.

The reaction of the compounds of formula I and II is suitably effected at a temperature of from 0° to 100° C. and optionally in the presence of water or organic solvents. The reaction is conveniently effected under alkaline conditions. The amounts of the two components I and II is preferably such that the ratio of reactive amino hydrogen atoms to epoxy groups is 1:0.5 to 1.2. The reaction may suitably be effected by adding the compound II to the compound I at a temperature of from 5° to 25° C. and then heating the mixture to about 40° to 80° C. Alternatively, the compound I may suitably be added to a solution of the compound II. The reaction is preferably continued until the required viscosity increase occurs. The reaction may be slowed or stopped by addition of water or by reducing the pH to, for example, 4 to 6, by addition of acid, for example hydrochloric, acetic or formic acid. As will be appreciated, the acid may react with end epoxy groups to produce, in the case of hydrochloric acid for example, chlorhydrin groups.

The resulting products of the invention, which are water-soluble and thermosetting, may be isolated and purified using conventional techniques.

The compounds of formulae I and II are either known or may be produced in conventional manner from available materials. For example, the compounds I may be obtained from the corresponding polyglycol dichlorohydrin ethers by addition of alkali in known manner.

The preferred compounds of formula I include those derived from ethylene and propylene glycols, in particular ethylene glycol and polyethylene glycol, with an average molecular weight of from 100 to 1500, preferably 200 to 800, in particular 600. In formula I, m preferably signifies 7 to 30, more preferably 7 to 14.

The compounds of formula II may suitably be produced by reaction of the appropriate polyalkylene polyamine with the appropriate acid. Suitable acids include natural and synthetic acids and functional derivatives, e.g. anhydrides, esters and chlorides, thereof. In formula II, R is preferably an alkyl radical which contains 2 to 21, more preferably 2 to 17 and, particularly, 2,9,11 or 17 carbon atoms. The polyalkylene polyamine portion is preferably derived from diethylene triamine, triethylene tetramine, tetraethylene pentamine, dipropylene triamine, tripropylene tetramine, tetrapropylene pentamine and adducts thereof with 1 to 3 moles of ethylene or propylene oxide.

As specific compounds of formula II, may be mentioned those of the following formulae:

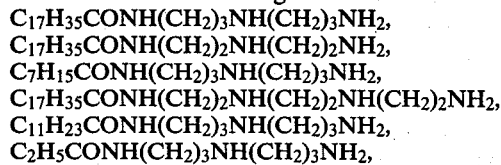

and

The invention also provides a method for the permanent antistatic finishing of synthetic polymeric materials comprising impregnating the substrate with an aqueous alkaline liquor of a polyaddition product of the invention. The invention also provides aqueous liquors of the compounds of the invention. If such liquors are not themselves alkaline, they are made alkaline, e.g., pH 7 to 11, before use, for example by addition of an alkali such as sodium hydroxide, carbonate or bicarbonate, or an organic base such as triethanolamine.

Suitable materials for finishing in accordance with the invention include hydrophobic synthetic polymeric materials, in particular textiles, comprising, for example, polyamides, polyolefines, polyesters, polyacrylonitrile polyvinylchloride and acetylcellulose (which, if in textile form, may be present in blends with natural fibres such as wool, cotton or silk).

The materials may be impregnated by conventional techniques such as padding or spraying. Suitably, from 0.1 to 1.5 weight per cent of the compound of the invention is employed based on the weight of the substrate. The products of the invention may be applied at long liquor ratios from exhaust baths without addition of anionic or non-ionic compounds to improve their power of exhaustion. At a bath temperature of 10° to 100° C., preferably 40° to 95° C., and a liquor ratio of 10:1 to 100:1 the treatment time may for example vary from 5 to 50 minutes. After treatment, the substrate may suitably be rinsed and then dried either at room temperature or, preferably, at 80° to 200° C.

In the following Examples, which illustrate the invention, the parts and percentages are by weight, the temperatures are in degrees centigrade, and the viscosities determined at 20° C.

EXAMPLE 1

In a sulphonation vessel, 158 parts of a polyglycol dichlorohydrin ether formed from 240 parts of polyethylene glycol-600 and 74 parts of epichlorohydrin are set with 53.4 parts of 30% sodium hydroxide solution and stirred for 75 minutes at 15°. The newly formed diepoxide is allowed to flow into 82 parts of a hexylene glycol solution of a condensation product formed by thermal condensation of 121.2 parts of stearic acid and 52.4 parts of dipropylene triamine which has been heated to 60°. The reaction mixture is stirred for 2 hours at 50°. Then, 36 parts of hexylene glycol are added to the slightly turbid solution and its pH is adjusted to about 6 with 14 parts of concentrated hydrochloric acid. 363 Parts of a slightly turbid, approximately 50% solution, having a viscosity of about 1200 cp.

Nylon fabric is treated at 50° to 85° and a liquor ratio of 40:1 in an aqueous bath set with 8% of the final product of this Example on the weight of the fabric and 1 gram per litre of sodium carbonate. After treatment for 20 minutes at 85°, the fabric is rinsed for 5 minutes in cold water, hydro-extracted and dried for 15 minutes at 140°. It is then conditioned for 24 hours at 20° and 65% relative humidity.

EXAMPLE 2

The procedure of Example 1 is followed, with the condensation product of stearic acid and dipropylene triamine being replaced by 35.5 parts of an acylation product formed from 81 parts of stearic acid and 31 parts of diethylene triamine at 140°-175°. This product is reacted with the diepoxide in solution in 36 parts of hexylene glycol. The pH value of the final product is adjusted to about 6 by the addition of 7.6 parts of concentrated hydrochloric acid. 358 Parts of a pale yellow solution of approximately 50% strength and viscosity of about 2,900 cp, are obtained.

EXAMPLE 3

In a reaction vessel with a stirrer, 158 parts of the dichlorohydrin ether of polyglycol 600 are mixed with 53 parts of 30% sodium hydroxide solution for 15 minutes at 14°. The mixture is stirred further for 1 hour at 15°-20°, then 23.2 parts of an acylation product formed by thermal condensation of 28.2 parts of caprylic acid with 26.2 parts of dipropylene triamine are added and the temperature increased to 60°. After 2 hours, a viscosity increase takes place. The batch is diluted with 50 parts of isopropanol and the pH adjusted to about 7 with 11.8 parts of concentrated hydrochloric acid. After further dilution with water, 333 parts of a slightly turbid, pale yellow liquid of approximately 50% strength and of viscosity of about 1140 cp, are obtained.

A fabric of polyester fibre and one of polyacrylonitrile fibre are added to an aqueous liquor containing 40 parts per litre of the final product of this Example and sufficient sodium carbonate for adjustment to pH 9. The expression on the padding machine leaves the fabric containing 80% of its weight of liquor. It is dried for 10 minutes at 150°.

EXAMPLE 4

In manner analogous to Example 3, polyester and polyacrylonitrile fibre may be treated with the product obtained by using, in place of the acylation product from caprylic acid and dipropylene triamine, 17.6 parts of a product formed by thermal condensation of 14.8 parts of propionic acid with 26.2 parts of dipropylene triamine, having a viscosity of about 150 cp (approximately 50% solution).

EXAMPLE 5

79 Parts of the dichlorohydrin ether of polyglycol 600 are entered into a sulphonation vessel and mixed for 1 hour at 15°-20° with 26.7 parts of 30% sodium hydroxide solution. A solution of 19.7 parts of an acylation product obtained by thermal condensation of 270 parts of stearic acid with 146 parts of triethylene tetramine are added, following which the mixture is stirred for 10 hours at 40°. A viscous solution is formed which is adjusted to pH 6.2 with 3.1 parts of concentrated hydrochloric acid and diluted with water. 914 Parts of a liquid of about 30% strength and having a viscosity of about 300 cp., are obtained.

The product may be applied to nylon fabric by the exhaust technique as described in Example 1.

EXAMPLE 6

A sulphonation vessel is charged with 79 parts of the dichlorohydrin ether of polyethylene glycol 600, then 26.7 parts of 30% sodium hydroxide solution are added in 15 minutes at 15° for conversion into the diepoxide. The mixture is stirred further for 1 hour at 15° to 20°, then 17 parts of an acylation product formed by thermal condensation of 112 parts of lauric acid with 65.5 parts of dipropylene triamine at 150° to 190° are added. The reaction mixture is raised to 70° and held at this temperature for 3½ hours, after which time an increase in viscosity is observable. The condensation product is diluted with 27 parts of isopropanol and the pH adjusted to 5 with 6.4 parts of concentrated hydrochloric acid. After further dilution with water 178 parts of a liquid of about 50% strength and having a viscosity of about 1300 cp, are obtained.

Polyester fabric is treated at a liquor ratio of 40:1 in an exhaust bath containing 5% of the final product of this Example in relation to the fabric weight. The fabric is entered at 20° to 30° and the bath raised to 60° to 80° in 20 minutes, at which point 1 gram per litre of sodium carbonate is added. Treatment is continued for 30 minutes at 90°. On removal from the bath the fabric is rinsed for 5 minutes with cold water, hydro-extracted and dried for 1 minute at 150°.

EXAMPLE 7

In manner analogous to Example 6, polyester may be treated with the product, a solution of about 50% strength having a viscosity of about 400 cp, obtained using, in place of the 17 parts of the condensation product from lauric acid and dipropylene triamine, 15.4 parts of an acylation product formed by thermal condensation of 448 parts of lauric acid with 216 parts of diethylene triamine, this product being reacted with the diepoxide of polyethylene glycol 600 for 50 minutes at 70°.

EXAMPLE 8

As described in the foregoing Example 6, 158 parts of the dichlorohydrin ether of polyglycol 600 are converted into the diepoxide in a sulphonation vessel by the addition of 53.4 parts of 30% sodium hydroxide solution at 15°. Subsequently 31.3 parts of an acylation product formed by thermal condensation of 90 parts of lauric acid with 65.5 parts of dipropylene triamine at 150° to 190° are entered. The reaction mixture is stirred for 1½ hours at 70°. It is diluted with 53 parts of isopropanol and adjusted to about pH 6 with 12.3 parts of concentrated hydrochloric acid. After further dilution with water 350 parts of a slightly yellowish solution of about 50% strength and viscosity of about 720 cp, are obtained.

EXAMPLE 9

In a sulphonation vessel, 60 parts of polyethylene glycol 300 are reacted with 37 parts of epichlorohydrin at 70° in the presence of 1 part of tin tetrachloride to give the dichlorohydrin ether. 97.3 Parts of the ether are converted into the diepoxide by dropwise addition of 53.4 parts of 30% sodium hydroxide solution at 14° to 20°. The diepoxide is reacted for 1½ hours at 70° with 33.5 parts of the acylation product of lauric acid and dipropylene triamine named in the preceding Example. After adjustment of the pH to 6 with concentrated hydrochloric acid and dilution with water, 232 parts of an approximately 50% liquid of slightly yellowish appearance and viscosity of about 7,700 cp, are obtained.

The treatment in nylon fabric is effected as in Example 1.

What is claimed is:

1. A water soluble polyaddition reaction product of
(a) a polyglycol diepoxide of formula I,

in which
R′ signifies hydrogen or methyl, and
m signifies an integer of from 7 to 30,
with (b) an amide of formula II,

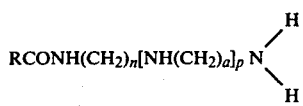

in which
R signifies an alkyl radical of 1 to 21 carbon atoms,
p signifies 1, 2, 3 or 4, and
n and a are the same or different, and each signifies 2 or 3,
having a viscosity at 20° C. of about 50 to about 20,000 cp, or a derivative thereof with acid.

2. A reaction product according to claim 1, of
(a) a diepoxide of formula I obtainable from a dichlorohydrin ether of polyethylene glycol of average molecular weight 200 to 800 by treatment with alkali with
(b) an amide of formula II in which R is an alkyl radical of 2 to 17 carbon atoms,
the amounts of said diepoxide and said amide being such that the ratio of reactive amino hydrogen atoms to epoxy groups is in the range 1:0.5 to 1:2 and said reaction product having a viscosity at 20° C. of about 100 to 15,000 cp, or a derivative thereof with hydrochloric, acetic or formic acid.

3. A reaction product according to claim 2, of
(a) a diepoxide from the dichlorohydrin ether of polyethylene glycol 600
with
(b) an amide of stearic acid with dipropylene triamine.

4. A reaction product, according to claim 2, of
(a) a diepoxide from the dichlorohydrin ether of polyethylene glycol 600
with
(b) an amide of lauric acid with dipropylene triamine.

5. A reaction product according to claim 1, having a viscosity at 20° C. of about 100 to 15,000 cp.

6. A reaction product according to claim 1, in which the compound of formula I is the diepoxide obtainable from the dichlorohydrin ether of polyethylene glycol, of average molecular weight 200 to 800, by treatment with alkali.

7. A reaction product according to claim 6, in which the average molecular weight of the polyethylene glycol is 600.

8. A reaction product according to claim 1, in which, in the compound of formula II, R signifies an alkyl radical of 2 to 17 carbon atoms.

9. A reaction product according to claim 8, in which, in the compound of formula II, R signifies an alkyl radical of 2, 9, 11 or 17 carbon atoms.

10. A reaction product according to claim 9,
in which, in the compound of formula II, either n is 3, a is 3 and p is 1, or n is 2, a is 2 and p is 1, or n is 2, a is 2 and p is 2, or n is 2, a is 2 and p is 3, or n is 3, a is 3 and p is 2, or n is 3, a is 3 and p is 3.

11. A reaction product according to claim 10, in which the compound of formula II is selected from compounds of formula
$C_{17}H_{35}CONH(CH_2)_3NH(CH_2)_3NH_2$,
$C_{17}H_{35}CONH(CH_2)_2NH(CH_2)_2NH_2$,
$C_7H_{15}CONH(CH_2)_3NH(CH_2)_3NH_2$,
$C_{17}H_{35}CONH(CH_2)_2NH(CH_2)_2NH(CH_2)_2NH_2$,
$C_{11}H_{23}CONH(CH_2)_3NH(CH_2)_3NH_2$,
$C_2H_5CONH(CH_2)_3NH(CH_2)_3NH_2$,
and
$C_{11}H_{23}CONH(CH_2)_2NH(CH_2)_2NH_2$.

12. A derivative of a polyaddition product of claim 1, with hydrochloric, acetic or formic acid.

13. A reaction product according to claim 1, in which the quantities of compounds I and II are such that the ratio of reactive amino hydrogen atoms to epoxy groups is from 1:0.5 to 1:2.

14. A process for the production of a reaction product according to claim 1, characterized by reacting a compound of formula I, stated in claim 1, with a compound of formula II, stated in claim 1, until the required viscosity increase occurs, and, where required, treating the resulting product with acid.

15. A process of claim 14, in which the quantity of the compounds I and II is such that the ratio of reactive amino hydrogen atoms to epoxy groups is from 1:0.5 to 1:2.

16. A process according to claim 14, in which the reaction is effected at 0° to 100° C.

17. A process according to claim 14, in which the product of the reaction of compounds I and II is treated with water to stop the reaction.

18. A process according to claim 14, in which the product of the reaction of compounds I and II is treated with hydrochloric, formic or acetic acid.

19. An aqueous liquor comprising a reaction product according to claim 1.

* * * * *